E. F. NORTHRUP.
ELECTRICAL MEASURING APPARATUS.
APPLICATION FILED JULY 15, 1918.
1,375,010.
Patented Apr. 19, 1921.
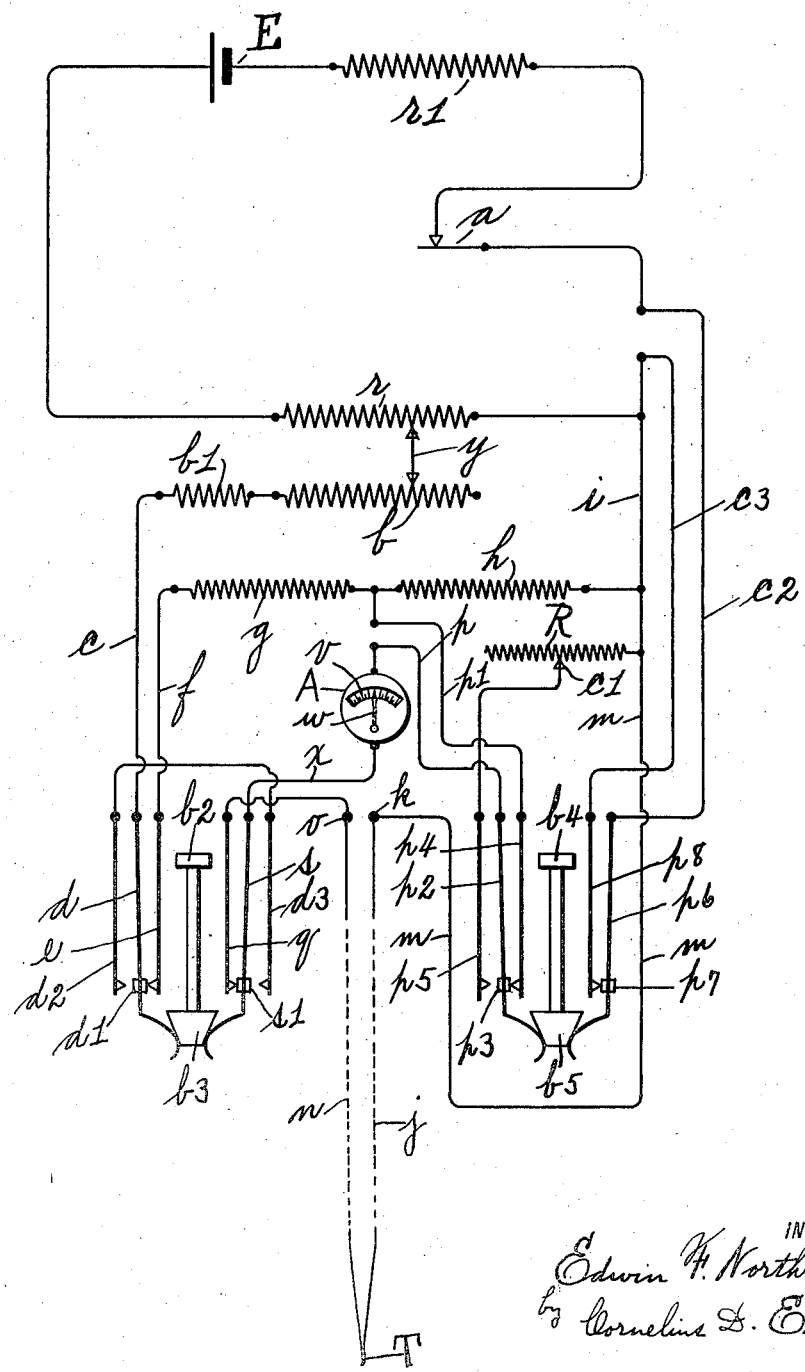
INVENTOR
Edwin F. Northrup
by Cornelius D. Ehret
his ATTORNEY

UNITED STATES PATENT OFFICE.

EDWIN F. NORTHRUP, OF PRINCETON, NEW JERSEY, ASSIGNOR TO PYROLECTRIC INSTRUMENT CO., OF TRENTON, NEW JERSEY, A CORPORATION OF NEW JERSEY.

ELECTRICAL MEASURING APPARATUS.

1,375,010.   Specification of Letters Patent.   Patented Apr. 19, 1921.

Application filed July 15, 1918. Serial No. 244,919.

*To all whom it may concern:*

Be it known that I, EDWIN F. NORTHRUP, a citizen of the United States, residing at Princeton, county of Mercer, State of New Jersey, have invented new and useful Electrical Measuring Apparatus, of which the following is a specification.

My invention relates to electrical measuring apparatus, and more particularly to an electrical pyrometer.

My invention resides in electrical measuring apparatus comprising a galvanometer, such as a milliammeter, galvanometer or similar instrument, preferably comprising a coil movable in a permanent magnet field, the galvanometer being first associated with a source of electro-motive-force of unknown value, such as a thermo-couple, in such circuit arrangement that by zero deflection of the galvanometer an electro-motive-force equal and opposite to the electro-motive-force of the unknown source or thermocouple is determined, the galvanometer later being placed in a circuit arrangement such that by its deflection it indicates the value of the unknown electro-motive-force or temperature of the thermo-couple, switching mechanism being provided for then connecting the thermo-couple or other source of unknown electro-motive-force in an isolated circuit with the galvanometer and an adjustable resistance or rheostat which is adjusted to such resistance value that the galvanometer will again deflect to the same extent under influence only of the thermocouple or source of electro-motive-force; the apparatus may then be used as a direct reading system for measuring temperatures or electro-motive-forces of a thermo-couple or other source of current, the apparatus used in the preliminary steps being in effect apparatus for adjusting or calibrating the circuit of the thermo-couple and galvanometer to proper resistance value.

Or otherwise stated, my invention comprises apparatus of the character disclosed in my prior Patents Numbered 1,245,609 and 1,245,956, November 6, 1917, with which is included an adjustable resistance or rheostat and suitable switching mechanism for isolating the galvanometer and thermo-couple in a circuit with the rheostat or adjustable resistance, the latter bringing the resistance of the entire circuit to proper value to insure that the deflections of the instrument will indicate the proper temperature or electro-motive-force.

For an illustration of one of the various forms my invention may take, reference is to be had to the accompanying drawing, which is a diagrammatic view of circuits and apparatus embodying my invention.

Referring to the drawing, E is any suitable source of direct current, such as a battery or dry cell, which need not be a standard cell or source of unvarying or constant electro-motive-force. When the switch $a$ is closed, current from the battery E passes through the resistances $r$ and $r^1$. In a circuit or branch in parallel or shunt with a variable portion of the resistance in circuit with the battery E, as a variable portion of the resistance $r$, are the serially connected resistances $b$, $b^1$, $g$ and $h$, one terminal of the resistance $h$ being connected by conductor $i$ with one terminal of the resistance $r$. The amount of resistance $b$ in the shunt or parallel branch or circuit is variable simultaneously with variation of the resistance $r$ by the double contact device $y$ which simultaneously passes over both resistances $r$ and $b$. One terminal of the resistance $b^1$ connects by conductor $c$ with the contact spring $d$ carrying the contact $d^1$ normally in engagement with the contact spring $e$ connected by conductor $f$ to one terminal of the resistance $g$. A second contact spring $d^2$, adapted to be engaged by the contact $d^1$, is connected with a similar contact spring $d^3$ adapted to be engaged by the contact $s^1$ on the contact spring $s$ connected by conductor $x$ with one terminal of the galvanometer A. The contact $s^1$ is normally in engagement with the contact spring $q$ connected with one of the binding posts $o$ to which is connected the lead $n$ from the thermo-junction T or other source of electro-motive-force, whose other terminal connects through lead $j$ with the binding post $k$, which connects by conductor $m$ with one terminal of the adjustable resistance or rheostat R and with one terminal of each of the resistances $r$ and $h$.

The galvanometer A, such as a milliammeter, is preferably of the well known D'Arsonval type of direct current measuring instrument comprising a coil movable in a permanent magnet field. It has a scale or scales $v$ with which coöperates the needle or pointer $w$ actuated by the moving coil of the instrument. The scale $v$ may be calibrated in any desirable or suitable units and though, in the particular example illustrated, the instrument is used as a current measuring instrument, as a milliammeter, the scale may be calibrated in units of voltage, as millivolts, or in units of temperature, or both. The remaining terminal of the galvanometer A connects to a point between the resistances $g$ and $h$ through the conductors $p$ and $p^1$ connected, respectively, to the contact springs $p^2$ and $p^4$, $p^2$ carrying a contact $p^3$ normally in engagement with the spring contact $p^4$. The contact $p^3$ is adapted to engage also the contact spring $p^5$ connected to the movable contact or rider $c^1$ of the adjustable resistance or rheostat R.

In circuit with the battery E and the resistances $r$ and $r^1$ is the normally closed switch, comprising the contact spring $p^6$ carrying the contact $p^7$ normally in engagement with the contact spring $p^8$, the springs $p^6$ and $p^8$ being connected, respectively, by conductors $c^2$ and $c^3$ to the switch $a$ and resistance $r$.

By pushing downwardly upon the button $b^2$ the conical or tapering member $b^3$ thrusts the lower ends of the contact springs $d$ and $s$ apart, causing the contacts $d^1$ and $s^1$ to leave the contact springs $e$ and $q$ and to engage the contact springs $d^2$ and $d^3$. Similarly, pushing downwardly upon the button $b^4$ causes the member $b^5$ to push the contact springs $p^2$ and $p^6$ apart., causing contact $p^3$ to separate from contact spring $p^4$ and to engage contact spring $p^5$, and to cause contact $p^7$ to separate from contact spring $p^8$.

The operation is as follows:

With the contacts $d^1$, $s^1$, $p^3$ and $p^7$ in their normal positions indicated in the drawing, the contact $y$ is moved to such position upon the resistances $r$ and $b$ that the galvanometer A does not deflect or indicates zero current therethrough. This means that the source of current of unknown electro-motive-force, as thermo-couple T, which is in series in this position of the switching mechanism with the galvanometer A and in a path in shunt to the resistance $h$, has opposed to it an equal and opposite electro-motive-force which is the fall of potential across the resistance $h$ caused by current from the battery E. The button $b^2$ is now depressed, separating contact $d^1$ from contact spring $e$ and bringing it into engagement with contact spring $d^2$, and simultaneously separating contact $s^1$ from contact spring $q$ and bringing it into engagement with the contact spring $d^3$. This switching operation cuts out of circuit the thermo-couple T and the resistance $g$, and has brought the galvanometer A into series relation with the resistance $h$ in place of the resistance $g$, whose magnitude and temperature coefficient are preferably equal to the resistance and temperature coefficient of the galvanometer A including its moving coil or any associated resistance, as described in the aforesaid Letters Patent No. 1,245,956. The galvanometer A will now be traversed by a current of the same magnitude that was previously flowing through resistances $g$ and $h$, and the resultant deflection indicates either the temperature of the thermo-couple T, or its electro-motive-force, or both if the instrument is provided with both a potential and a temperature scale.

The deflection or reading of the galvanometer A having thus been taken for the then temperature of the thermo-couple T, the pressure upon button $b^2$ is released, and the member $b^3$ returns to normal position indicated under the influence of the spring, not shown. The button $b^4$ is then depressed, and may be held in the depressed position by any suitable stop or lock, not shown. This causes contact $p^3$ to engage the contact spring $p^5$ and contact $p^7$ to separate from contact spring $p^8$, the latter operation opening the circuit of the battery E. We then have the galvanometer A connected in a closed circuit through the switch $s$, $q$ in series with the thermo-couple T, conductor $m$, adjustable resistance or rheostat R, and through the now closed switch $p^2$, $p^5$. When this circuit arrangement has been established, the rider $c^1$ is adjusted along the resistance $r$ to that position which will bring the needle or pointer $w$ of the galvanometer A back to the same position of deflection occurring upon depression of the button $b^2$ as above described. This means that there is now flowing through the galvanometer A a current of the same magnitude as before, and, the temperature of the thermo-couple being the same as before, because the switching operations are so quickly accomplished, the resistance of the thermo-couple circuit through its leads, galvanometer A and resistance R, is now the proper resistance to insure that the thermo-couple T, even when at new or different temperatures, will as a source of current cause passage of the correct amount of current through the galvanometer A to cause a deflection which will directly indicate either the electro-motive-force of the thermo-couple or its temperature, the temperature scale of the instrument A of course having been predetermined for the particular thermo-couple used.

In this way the readings of temperature or electro-motive-force may be taken with the thermo-couple connected simply in series with the galvanometer A, and the amount of resistance in the circuit may be checked from time to time by reverting to the adjustment of the contact $y$ and operation of the switching mechanism by the button $b^2$. If the resistance of the thermocouple circuit when in series with the galvanometer A and resistance R does not vary, checking is not necessary; but inasmuch as lead resistances or other resistance in the circuit may from time to time vary, the above described checking becomes necessary, and the instrument is checked whenever it is believed that a change in the resistance of the thermo-couple circuit may have occurred.

The switch $a$ will ordinarily be opened when the apparatus is out of use. This may be done manually, or it may result automatically from actuation after predetermined movement of the contact device $y$, as, for example, when the latter is moved off of the resistances $r$, $b$.

While in accordance with the patent statutes I have herein illustrated and described the preferred embodiment of my invention, it will be understood that my invention is not limited thereby and its scope is to be determined by the appended claims.

What I claim is:

1. The combination with a resistance, of a deflection instrument and a source of electro-motive-force of unknown value connected in series with each other in a path in parallel to a path including said resistance, means for passing through said resistance a current of magnitude causing therein a fall of potential equal to the unknown electro-motive-force of said source, means for disconnecting said source of electro-motive-force of unknown value and for connecting said deflection instrument in a circuit relation causing said instrument to produce a deflection indicative of the value of the unknown electro-motive force, means for connecting said source of electro-motive-force of unknown value and said deflection instrument in an independent circuit, and means for adjusting the resistance of said independent circuit to a value at which said deflection instrument will indicate the value of the unknown electro-motive-force of said source.

2. The combination with a resistance, of a galvanometer and a thermo-couple connected in a path in parallel with a path including said resistance, said galvanometer comprising a coil movable in a permanent magnet field, means for passing through said resistance a current of magnitude causing therein a fall of potential equal to the electro-motive-force of said thermo-couple, means for disconnecting said thermo-couple and for connecting said galvanometer in a circuit relation causing said galvanometer to produce a deflection indicative of the electro-motive-force of said thermo-couple, means for connecting said thermo-couple and said galvanometer in an independent circuit, and means for adjusting the resistance of said independent circuit to a value causing said galvanometer to produce a deflection varying with the temperature or electro-motive-force of said thermo-couple.

3. The combination with a galvanometer and a source of electro-motive-force of unknown value, of a resistance path, said galvanometer and source of electro-motive-force connected in a branch in parallel to said resistance path, means for passing through said resistance path a current of magnitude causing a fall of potential equal to the unknown electro-motive-force of said source, means for disconnecting said source of electro-motive-force of unknown value and for connecting said galvanometer in a circuit relation wherein it is traversed by a current of said magnitude, whereby said galvanometer produces a deflection indicative of the value of the unknown electro-motive-force, means for connecting said galvanometer and source of electro-motive-force in an independent circuit, and means for adjusting the resistance of said independent circuit to a value causing said galvanometer to produce a deflection indicative of the value of the unknown electro-motive-force.

4. The combination with a milliammeter and a thermo-couple, of a resistance path, said milliammeter and said thermo-couple connected in a branch in parallel with said resistance path, means for passing through said resistance path a current of magnitude causing a fall of potential equal to the unknown electro-motive-force of said source, means for disconnecting said thermo-couple and for connecting said milliammeter in a circuit relation wherein it is traversed by a current of said magnitude, means for connecting said thermo-couple and said milliammeter in an independent circuit, and an adjustable resistance for bringing the resistance of said independent circuit to a value which will cause deflections of said milliammeter to indicate the electro-motive-forces or temperatures of said thermo-couple.

5. The combination with a circuit including a source of current and resistance, of a branch circuit containing resistance and connected in parallel with a part of said circuit, a galvanometer and a source of electro-motive-force of unknown value connected in a path in parallel with said branch circuit, means for adjusting the strength of current in said branch circuit to a magnitude causing a fall of potential equal to the unknown electro-motive-force of said source, means for disconnecting said source of electro-motive-force of unknown value and for connecting said galvanometer in a circuit relation wherein it indicates the value of the unknown electro-motive-force, an adjustable resistance, and switching mechanism for connecting said adjustable resistance in a circuit with said galvanometer and said source of electro-motive-force and for interrupting said first named circuit.

6. The combination with a circuit including a source of current and resistance, of a branch circuit containing resistance and connected in parallel with a part of said circuit, a galvanometer and a source of electro-motive-force of unknown value connected in a path in parallel with said branch circuit, means for adjusting the strength of current in said branch circuit to a magnitude causing a fall of potential equal to the unknown electro-motive-force of said source, means for disconnecting said source of electro-motive-force of unknown value and for connecting said galvanometer in a circuit relation wherein it indicates the value of the unknown electro-motive-force, an adjustable resistance, and switching mechanism for disconnecting said galvanometer from said branch circuit and for connecting the same in circuit with said source of electro-motive-force and said adjustable resistance.

7. The combination with a circuit including a source of current and resistance, of a branch circuit containing resistance and connected in parallel with a part of said circuit, a galvanometer and a thermo-couple connected in series with each other in a path in parallel with said branch circuit, means for adjusting the strength of current in said branch circuit to a magnitude causing a fall of potential equal to the electro-motive-force of said thermo-couple, means for disconnecting said thermo-couple and for connecting said galvanometer in a circuit relation wherein it indicates the value of the electro-motive-force of said thermo-couple, an adjustable resistance, and switching mechanism for connecting said adjustable resistance in circuit with said galvanometer and said thermo-couple and for interrupting said first named circuit.

8. The combination with a circuit including a source of current and resistance, of a branch circuit containing resistance and connected in parallel with a part of said circuit, a galvanometer and a thermo-couple connected in series with each other in a path in parallel with said branch circuit, means for adjusting the strength of current in said branch circuit to a magnitude causing a fall of potential equal to the electro-motive-force of said thermo-couple, means for disconnecting said thermo-couple and for connecting said galvanometer in a circuit relation wherein it indicates the value of the electro-motive-force of said thermo-couple, an adjustable resistance, and switching mechanism for disconnecting said galvanometer from said branch circuit and for connecting the same in circuit with said thermo-couple and said adjustable resistance.

9. The combination with a deflection instrument and a source of electro-motive-force of unknown value, of means for producing a potential difference equal to the electro-motive-force of said source, switching mechanism having one position in which said deflection instrument is simultaneously subjected to said potential difference and the electro-motive-force of said source in opposition to each other, said switching mechanism in another position disconnecting said source of electro-motive-force and bringing said deflection instrument into a circuit relation with said means causing said instrument to produce a deflection indicative of the value of the electro-motive-force of said source, means for connecting said source of electro-motive-force and said deflection instrument in an independent circuit, and means for adjusting the resistance of said independent circuit to a value at which said deflection instrument will indicate the value of the unknown electro-motive-force of said source.

10. The combination with a deflection instrument and a thermo-couple, of means for producing a potential difference equal to the electro-motive-force of said thermo-couple, switching mechanism having one position in which said deflection instrument is simultaneously subjected to said potential difference and the electro-motive-force of said thermo-couple in opposition to each other, said switching mechanism in another position disconnecting said thermo-couple and bringing said deflection instrument into a circuit relation with said means causing said instrument to produce a deflection indicative of the value of the electro-motive-force of said thermo-couple, means for connecting said thermo-couple and said deflection instrument in an independent circuit, and means for adjusting the resistance of said independent circuit to a value at which said deflection instrument will indicate the value of the electro-motive-force of said thermo-couple.

In testimony whereof I have hereunto affixed my signature this 12th day of July, 1918.

EDWIN F. NORTHRUP.